United States Patent
Zhang et al.

(10) Patent No.: US 10,663,649 B2
(45) Date of Patent: May 26, 2020

(54) LIGHT GUIDE PLATE AND METHOD FOR PREPARING THE SAME, BACKLIGHT MODULE AND DISPLAY DEVICE

(71) Applicants: HEFEI BOE DISPLAY LIGHTING CO., LTD., Hefei, Anhui (CN); BOE TECHNOLOGY GROUP CO., LTD., Beijing (CN)

(72) Inventors: Qiping Zhang, Beijing (CN); Yeshun Xu, Beijing (CN); Xing Wang, Beijing (CN); Xiang Liu, Beijing (CN); Zungan Ling, Beijing (CN)

(73) Assignees: HEFEI BOE DISPLAY LIGHTING CO., LTD., Hefei, Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/415,189

(22) Filed: May 17, 2019

(65) Prior Publication Data
US 2020/0041717 A1  Feb. 6, 2020

(30) Foreign Application Priority Data
Aug. 1, 2018  (CN) .......................... 2018 1 0864289

(51) Int. Cl.
*F21V 8/00* (2006.01)
(52) U.S. Cl.
CPC .................. *G02B 6/0088* (2013.01)
(58) Field of Classification Search
CPC .................................................. G02B 6/0088
See application file for complete search history.

(56) References Cited

U.S. PATENT DOCUMENTS

| 2004/0072025 | A1* | 4/2004 | Kishimoto | B82Y 25/00 428/842.3 |
| 2014/0189982 | A1* | 7/2014 | Li | A44B 99/00 24/303 |
| 2014/0192292 | A1* | 7/2014 | Li | G02B 6/0088 349/65 |
| 2017/0192160 | A1* | 7/2017 | Ham | G02B 6/0055 |
| 2017/0205571 | A1* | 7/2017 | Kim | G02F 1/133615 |
| 2018/0101047 | A1* | 4/2018 | Li | G02F 1/133308 |

(Continued)

FOREIGN PATENT DOCUMENTS

| CN | 101246232 A | | 8/2008 | |
| CN | 102654600 A | * | 8/2011 | ............... G02B 6/00 |
| CN | 102654600 A | | 9/2012 | |

(Continued)

OTHER PUBLICATIONS

First Office Action for Chinese Application No. 201810864289.X, dated Sep. 26, 2019, 7 Pages.

(Continued)

*Primary Examiner* — Donald L Raleigh
(74) *Attorney, Agent, or Firm* — Brooks Kushman P.C.

(57) ABSTRACT

Provided are a light guide plate and a method for preparing the same, a backlight module, and a display device. The light guide plate includes a substrate having a first surface and a second surface; and a dot layer arranged on the second surface, in which the dot layer includes magnetic particles, and the first surface is a light exiting surface of the light guide plate.

16 Claims, 1 Drawing Sheet

(56) References Cited

U.S. PATENT DOCUMENTS

2019/0129090 A1* 5/2019 Ying .................. G02F 1/133308
2019/0129091 A1* 5/2019 Yamamoto ........... G02B 6/0088

FOREIGN PATENT DOCUMENTS

| CN | 102789013 A | 11/2012 |
|---|---|---|
| CN | 103115425 A | 5/2013 |
| CN | 105911745 A | 8/2016 |
| CN | 108107625 A | 6/2018 |
| JP | 10876117 A | 3/1996 |

OTHER PUBLICATIONS

1$^{st}$ Chinese Office Action, English Translation.
CN101246232A, English Abstract and Machine Translation.
CN102654600A, English Abstract and Machine Translation.
CN102789013A, English Abstract and Machine Translation.
CN103115425A, English Abstract and Machine Translation.
CN105911745A, English Abstract and Machine Translation.
CN108107625A, English Abstract and Machine Translation.
JPH0876117A, English Abstract and Machine Translation.

* cited by examiner

LIGHT GUIDE PLATE AND METHOD FOR PREPARING THE SAME, BACKLIGHT MODULE AND DISPLAY DEVICE

CROSS-REFERENCE TO RELATED APPLICATION

This application claims priority to Chinese Patent Application No. 201810864289.X filed on Aug. 1, 2018, which is incorporated herein by reference in its entirety.

TECHNICAL FIELD

The present disclosure relates to the field of display technology, in particular to a light guide plate and a method for preparing the same, a backlight module, and a display device.

BACKGROUND

A liquid crystal display mainly includes a liquid crystal panel and a backlight. The backlight can be mainly classified into Light Emitting Diode (LED) backlight and Cold Cathode Fluorescent Lamp (CCFL) backlight according to the type of light source. With an increase in the market demand for display elements of thin type and lower power consumption, LED-based backlight occupies an absolute dominant position.

At present, after the backlight module product in the display device is defective, a buffer rubber is usually added or the initial structural design is modified, and the samples are re-produced for an improvement verification, which is not only time-consuming, but also has high cost. In addition, after the printed light guide plate is produced, it may have a certain proportion of bad warpage and deformation due to the differences in storage environment and in exposure time. When the deformed light guide plate is assembled into a backlight module, it may cause a problem in the structure that the mold material is displaced in the diffusion sheet and the brightness enhancement sheet above the light guide plate, and the black and white shadow may be caused in the distortion of the screen. This type of light guide plate is poor in single material, and cannot be assembled into a finished product. Thus, it can only be disposed as scrap, and the loss in material is huge.

SUMMARY

In one aspect, an embodiment of the present disclosure provides a light guide panel, including a substrate having a first surface and a second surface; and a dot layer arranged on the second surface, in which the dot layer includes magnetic particles, and the first surface is a light exiting surface of the light guide plate.

Optionally, the magnetic particles are magnetic spheres.

Illustratively, the magnetic spheres include a spherical wrapping layer on an outer side of the magnetic sphere, and a magnetic material on an inner side of the magnetic sphere and wrapped by the spherical wrapping layer.

Optionally, the magnetic material includes one or more of: ferrite magnetic material powder, samarium cobalt magnetic material powder, and neodymium iron boron magnetic material powder.

Optionally, the magnetic spheres have each a diameter of 300 nm or less.

Optionally, a material of the spherical wrapping layer is a non-magnetic material.

For example, the material of the spherical wrapping layer is aluminum.

Optionally, the spherical wrapping layer has a thickness of 80 nm to 100 nm.

Optionally, the magnetic particles are non-spherical particles.

For example, non-spherical particle includes a magnetic ellipsoid, a magnetic cylinder, a magnetic cuboid or a magnetic prism.

On another hand, an embodiment of the present disclosure further provides a method for preparing the above light guide plate, including: preparing the dot layer on the second surface of the substrate through an ink printing process using an ink doped with magnetic particles.

Optionally, the dot layer is prepared through a printing screen of 80 mesh to 325 mesh.

Optionally, after the ink printing operation on the light guide plate, the light guide plate is placed in a magnetic field to magnetize the magnetic particles in the dot layer.

In still another aspect, an embodiment of the present disclosure further provides a backlight module, including a back plate and the above light guide plate.

The back plate is an iron alloy-containing plate, and a magnetic attraction force is generated between the bottom surface of the light guide plate and the back plate.

In another aspect, an embodiment of the present disclosure further provides a display device including the above backlight module.

Other features and advantages of the present disclosure will be set forth in the description which follows, and some will be obvious from the description, or learned by implementing embodiments of the present disclosure. The objectives and other advantages of the present disclosure can be realized and obtained by the structure particularly set forth in specification, drawings, and claims.

BRIEF DESCRIPTION OF THE DRAWINGS

The drawings described herein are intended to provide a further understanding of the technical solutions of the present disclosure, and constitute a part of this disclosure. They together with the embodiments of the present disclosure are intended to illustrate the technical solutions of the present disclosure, and do not constitute a limitation of the technical solutions of the present disclosure.

DETAILED DESCRIPTION

The embodiments of the present disclosure will be described in detail below with reference to the drawings. It should be noted that the embodiments in the disclosure and the features in the embodiments can be arbitrarily combined with each other, as long as they contradict each other.

Figure 1:
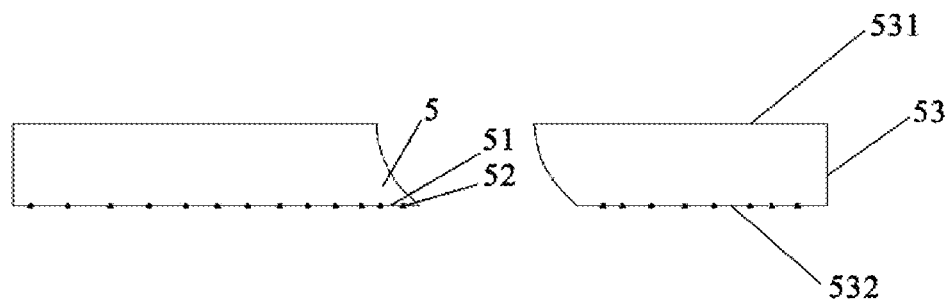
FIG. 1 is a schematic view of a light guide plate according to an embodiment of the present disclosure.

In one embodiment of the present disclosure, the present disclosure provides a light guide plate. As shown in FIG. 1, the light guide plate 5 includes a substrate 53 having a first surface 531 and a second surface 532; and a dot layer 51 arranged on the second surface 532, in which the dot layer 51 includes magnetic particles 52, and the first surface 531 is a light exiting surface of the light guide plate 5.

In a specific operation, the light guide plate 5 can allow a magnetic attraction force between the light guide plate 5 and the iron alloy-containing back plate via the optional magnetic particles 52, so as to enable the light guide plate 5 to realize a corresponding position fixing operation, thereby effectively avoiding light leakage or white spot defects caused by impact or friction of the light guide plate 5 in the mechanical experiment. At the same time, the presence of the magnetic attraction force can correct the shape of the deformed light guide plate 5, so that the upper surface of the light guide plate 5 tends to be flat, and the degree of warpage of the surface of the light guide plate 5 is reduced, thereby avoiding problems such as displacement of the mold material.

Figure 2:
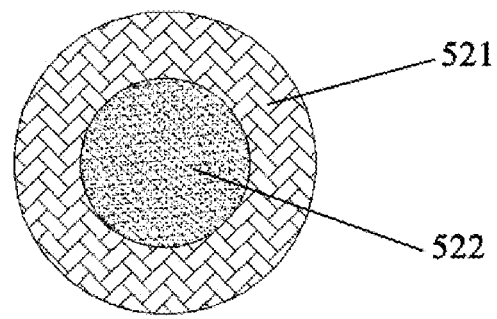
FIG. 2 is a cross-sectional view of the magnetic particles according to the embodiment shown in FIG. 1 of the present disclosure.

As shown in FIG. 2, the magnetic particles 52 in this embodiment are magnetic spheres. The magnetic spheres include a spherical wrapping layer 521 on the outer side of the magnetic sphere, and a magnetic material 522 on the inner side of the magnetic sphere and wrapped by the spherical wrapping layer.

In the specific operation, the above optional spherical structure can facilitate subsequent ink printing forming operations. As compared to other structures, the spherical structure is easier to achieve a uniform mixing operation with the ink. The optional wrapping layer can allow efficient containment operation of the magnetic material and also enhance the shaping of the magnetic particles 52.

It should be noted that the magnetic particles each in the embodiment may also be a non-spherical particle, such as a magnetic ellipsoid, a magnetic cylinder, a magnetic cuboid or a magnetic prism. The above shape of the non-spherical particle can also ensure a good structural stability of the magnetic particles, and can ensure a relatively stable magnetic attraction force between the light guide plate 5 and the back plate.

The magnetic material in the present embodiment includes one or more of: ferrite magnetic material powder, samarium cobalt magnetic material powder, and neodymium iron boron magnetic material powder. The above optional magnetic material can allow a stable magnetic attraction force between the light guide plate 5 and the iron alloy-containing back plate, thereby effectively ensuring the positional stability of the light guide plate 5.

In a specific operation, the magnetic material encapsulated in the spherical wrapping layer may be a single magnetic material such as a ferrite magnetic material powder, or may be a mixed magnetic material such as a ferrite or a samarium cobalt magnetic material powder. A person skilled in the art can select a corresponding magnetic material according to the actual situation, so as to generate sufficient magnetic attraction force between the light guide plate 5 and the back plate.

In this embodiment, the diameter of the magnetic sphere is less than or equal to 300 nm. The diameter of the optional magnetic sphere can effectively ensure the molding efficiency of the ink printing process. In the specific operation, if the diameter of the sphere is too large, the magnetic particles 52 and the ink are difficult to form a state of uniform stirring, which also causes a certain difficulty in the ink printing process.

In this embodiment, the thickness of the spherical wrapping layer is 80 nm to 100 nm, and optionally 100 nm. The above optional thickness of the wrapping layer can overcome the defects that the waste of the wrapping material is caused by the wrapping layer being too thick, and magnetic material to be contained is too little; and can overcome the defect that a low structural stability of the magnetic particles 52 is caused by the wrapping layer being too thin.

In this embodiment, the material of the spherical wrapping layer is a non-magnetic material, and optionally aluminum. In the magnetic shielding technology, the magnetic field cannot penetrate the magnetic substance, but the magnetic field can penetrate the non-magnetic substance without deformation, that is, the magnetic induction line can directly penetrate the spherical wrapping layer of the non-magnetic material. Therefore, the spherical wrapping layer made of the non-magnetic material does not affect the magnetic attraction force between the inner magnetic material and the iron alloy-containing back plate, and allows a stable magnetic attraction force between the light guide plate and the iron alloy-containing back plate.

In another embodiment of the present disclosure, the present disclosure provides a method for preparing the light guide plate in the above embodiment, including: preparing a dot layer on the second surface of the substrate through an ink printing process using an ink doped with magnetic particles. The above optional ink printing process can allow the magnetic particles being stably fixed on the bottom surface of the light guide plate, and can ensure the overall structural stability among the light guide plate, the dot layer and the magnetic particles.

In this embodiment, the dot layer is made through a printing screen of 80 mesh to 325 mesh. The optional printing screen allows the final shaped dot structure more reasonable.

In this embodiment, after the ink printing operation on the light guide plate, the light guide plate is placed in a magnetic field to magnetize the magnetic particles in the dot layer.

It should be noted that the material that has been magnetized is not magnetic at any temperature. Magnetic materials all have a critical temperature called Curie temperature (Tc). Above the Curie temperature, due to the intense thermal motion of the atoms at high temperatures, the arrangement of the atomic magnetic moments is chaotic and disordered, and the magnetization intensity of the ferromagnetic material decreases with increasing temperature, until the magnetic properties disappear. Since the general operating temperature of the display device, including the maximum temperature of the environmental test, is within 100° C., the ferrite, samarium cobalt, neodymium iron boron magnetic materials described in the above embodiments all have a Curie temperature of 320° C. to 800° C.

Therefore, the magnetic particles including the above magnetic material powder have stable magnetic properties, and can effectively ensure a stable magnetic attraction force between the light guide plate and the back plate.

Figure 3:
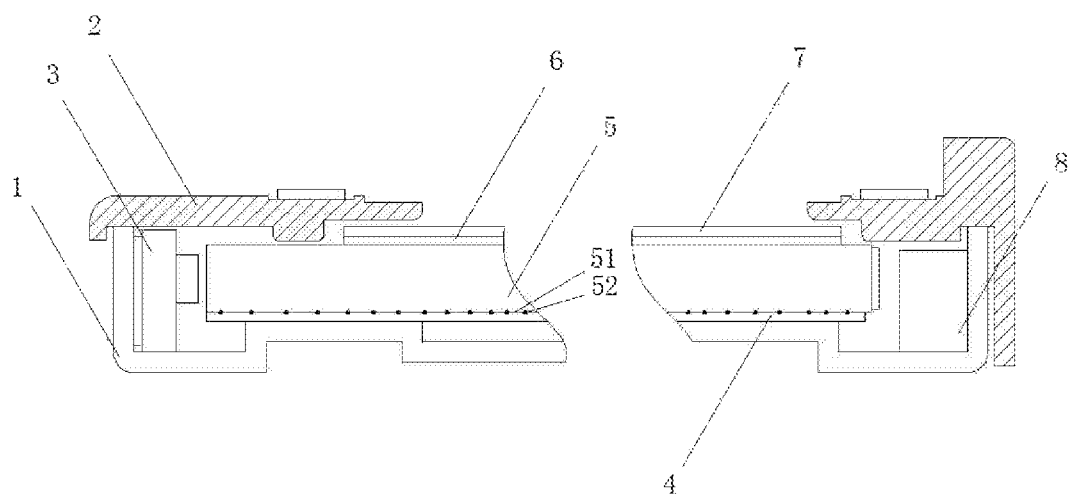
FIG. 3 is a schematic view of a backlight module according to another embodiment of the present disclosure.

In still another embodiment of the present disclosure, the present disclosure provides a backlight module. As shown in FIG. 3, the backlight module includes the light guide plate 5 in the above embodiment, and the back plate 1. The back plate 1 is an iron alloy-containing plate. There is a magnetic attraction force between the bottom surface of the light guide plate 5 and the back plate 1.

In the specific operation, the back plate 1 of the iron alloy-containing plate is arranged to ensure that it together with the magnetic particles 52 in the dot layer 51 of the light guide plate 5 form a stable magnetic force, thereby effectively ensuring stable adsorption of the light guide plate 5 on the back plate 1; and further thereby effectively avoiding light leakage or white spot defects caused by impact or friction of the light guide plate 5 in the mechanical experiment; at the same time, the presence of the above magnetic attraction force can also reduce the degree of warpage of the surface of the light guide plate 5, and can effectively avoid problems such as displacement of the film.

In this embodiment, the backlight module further includes a rubber frame 2, an LED lamp group 3, a reflection sheet 4, a diffusion sheet 6, a brightness enhancement sheet 7, and a buffer rubber 8. The back plate 1 and the rubber frame 2 constitute a structural skeleton of the backlight module. The LED lamp group 3, the reflection sheet 4, the light guide plate 5, the diffusion sheet 6, the brightness enhancement sheet 7, and the cushion rubber 8 are optical parts.

In the specific operation, the thickness of the reflective sheet 4 is less than 0.20 mm, and the reflective sheet 4 having the above optional thickness can ensure a stable magnetic attraction force between the light guide plate 5 and the back plate 1, so that the light guide plate 5 is stably adsorbed on the back plate 1, and may effectively overcome the defect that the magnetic attraction force is weak due to the excessive thickness of the reflection sheet 4.

In still another embodiment of the present disclosure, the present disclosure provides a display device including the backlight module described in the above embodiments.

As compared with the prior art, the present disclosure can realize the position fixing operation of the light guide plate through the optional magnetic particles, thereby effectively avoiding light leakage or white spot defects caused by impact or friction of the light guide plate in the mechanical experiment; it is also possible to improve the flatness of the surface of the light guide plate and to reduce the degree of warpage of the surface of the light guide plate, thereby avoiding problems such as displacement of the film material caused by unevenness of the surface of the light guide plate.

In the description of the present disclosure, the terms "set", "link", "connect", "fix", etc., should be interpreted broadly. For example, "connect" may be a fixed connection, a detachable connection, or an integral connection; and can be connected directly or indirectly through an intermediary medium. The specific meanings of the above terms in the present disclosure can be understood by a person skilled in the art on a case-by-case basis.

In the description of the present specification, the term "one embodiment", "some embodiments", "specific embodiment", etc., means that a particular feature, structure, material, or characteristic described with reference to this embodiment or example is included in at least one embodiment or example of the present disclosure. In the present specification, the schematic representation of the above terms does not necessarily refer to the same embodiment or example. Furthermore, the specific features, structures, materials or features may be combined in any suitable manner in any one or more embodiments or examples.

It should be understood by a person skilled in the art that the embodiments disclosed in the present disclosure are as described above, but they are merely used to facilitate the understanding of the embodiments of the present disclosure, and are not intended to limit the embodiments of the present disclosure. Any modification and variation in the form and details of the embodiments may be made by a person skilled in the art without departing from the spirit and scope of the embodiments of the present disclosure. The scope of patent protection is still subject to the scope defined by the appended claims.

What is claimed is:

1. A light guide plate, comprising
a substrate having a first surface and a second surface; and
a dot layer arranged on the second surface, wherein the dot layer comprises magnetic particles, the magnetic particles are magnetic spheres, the magnetic spheres comprise a spherical wrapping layer on an outer side of the magnetic sphere, and a magnetic material on an inner side of the magnetic sphere and wrapped by the spherical wrapping layer, and wherein the first surface is a light exiting surface of the light guide plate.

2. The light guide plate of claim 1, wherein the magnetic material comprises one or more of:
ferrite magnetic material powder, samarium cobalt magnetic material powder, and neodymium iron boron magnetic material powder.

3. The light guide plate of claim 1, wherein the magnetic spheres each have a diameter of 300 nm or less.

4. The light guide plate of claim 1, wherein a material of the spherical wrapping layer is a non-magnetic material.

5. The light guide plate of claim 1, wherein a material of the spherical wrapping layer is aluminum.

6. The light guide plate of claim 1, wherein the spherical wrapping layer has a thickness of 80 nm to 100 nm.

7. A backlight module, comprising a back plate and the light guide plate of claim 1, wherein the back plate is an iron alloy-containing plate, and a magnetic attraction force is generated between the bottom surface of the light guide plate and the back plate.

8. A display device comprising the backlight module of claim 7.

9. A method for preparing a light guide plate, the light guide plate comprising a substrate having a first surface and a second surface; and a dot layer arranged on the second surface, wherein the dot layer comprises magnetic particles, and the first surface is a light exiting surface of the light guide plate; and the method comprising:
preparing the dot layer on the second surface of the substrate through an ink printing process using an ink doped with magnetic particles.

10. The method of claim 9, wherein the dot layer is prepared through a printing screen of 80 mesh to 325 mesh.

11. The method of claim 9, wherein after the ink printing operation on the light guide plate, the light guide plate is placed in a magnetic field to magnetize the magnetic particles in the dot layer.

12. The method of claim 9, wherein the magnetic particles are magnetic spheres.

13. The method of claim 12, wherein the magnetic spheres comprise a spherical wrapping layer on an outer side of the magnetic sphere, and a magnetic material on an inner side of the magnetic sphere and wrapped by the spherical wrapping layer.

14. The method of claim 13, wherein the magnetic material comprises one or more of:
ferrite magnetic material powder, samarium cobalt magnetic material powder, and neodymium iron boron magnetic material powder.

15. The method of claim 12, wherein the magnetic spheres each have a diameter of 300 nm or less.

16. The method of claim 13, wherein a material of the spherical wrapping layer is a non-magnetic material.

* * * * *